Dec. 7, 1971     D. RICH     3,624,922

EDUCATIONAL DEVICE

Filed April 3, 1970     2 Sheets-Sheet 1

INVENTOR.
DENNIS RICH

Dec. 7, 1971  D. RICH  3,624,922
EDUCATIONAL DEVICE
Filed April 3, 1970  2 Sheets-Sheet 2
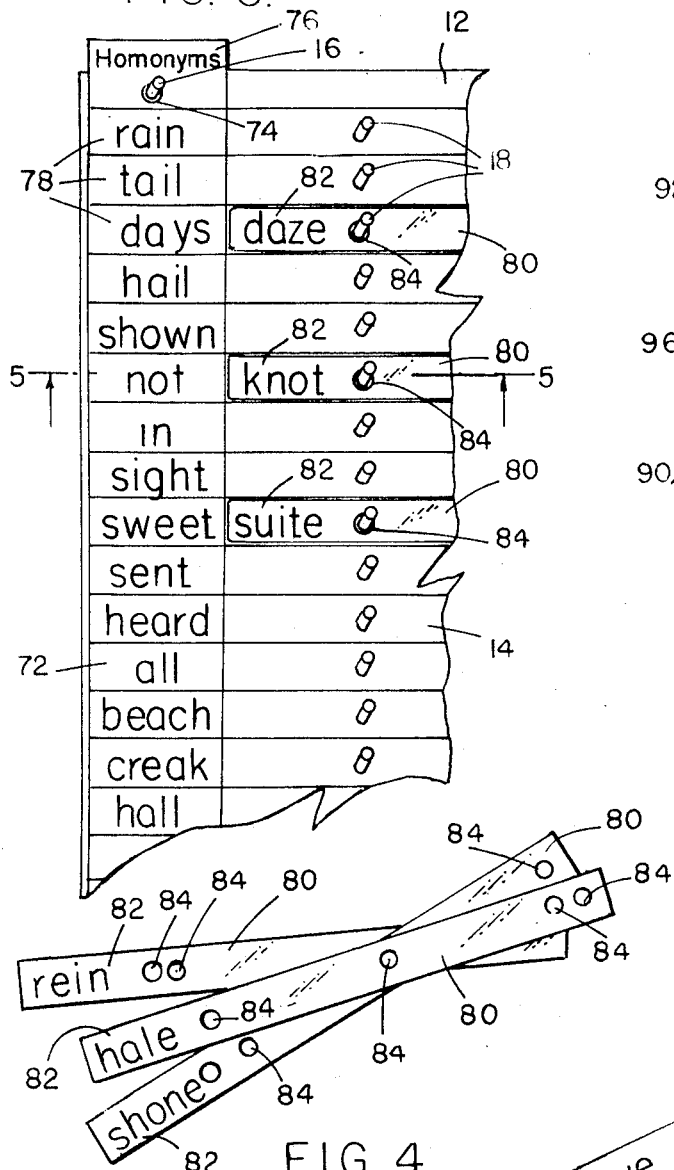
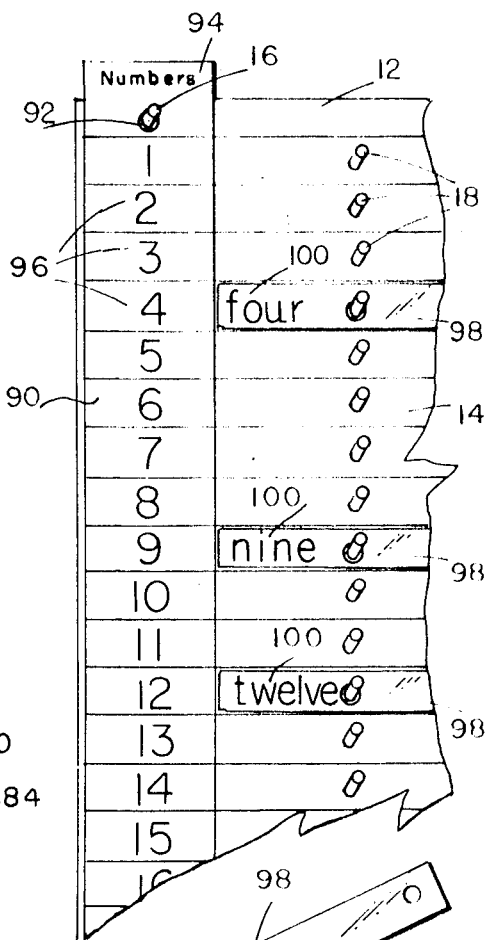
INVENTOR.
DENNIS RICH
BY
Friedman + Goodman
Attorneys United States Patent Office 3,624,922
Patented Dec. 7, 1971

3,624,922
EDUCATIONAL DEVICE
Dennis Rich, Flushing, N.Y., assignor to General Learning Corporation, Morristown, N.J.
Filed Apr. 3, 1970, Ser. No. 25,435
Int. Cl. G09b 3/02
U.S. Cl. 35—9 R                 9 Claims

ABSTRACT OF THE DISCLOSURE

An educational device having a planar board provided with projections thereon for mounting a primary information bearing member and a plurality of secondary information bearing members for self-correcting and self-instructional teaching. The projections are disposed on the board in a preset arrangement so that each of the secondary information bearing members can be mounted on the board in only one position adjacent to the primary information bearing member. The information on the primary member is arranged in columnar form, whereby the secondary members are mounted in columnar form. Each secondary member is disposed in juxtaposition with correlated information on the primary member to self-teach an educational subject to the user of the device.

BACKGROUND OF THE INVENTION

Though self-teaching devices are old in the art, there is a need today for simple self-teaching devices, particularly ones that are self-correcting. With the popularity of pre-school and early learning materials, it is anticipated that the next few years will see ever increasing requirements for programmed education at all levels, pre-school through adult levels. Availability of suitable self-teaching devices have become one of the most important tools in the educational field.

SUMMARY OF THE INVENTION

This invention relates to an educational device, and more particularly to a self-teaching device that is also self-correcting. The device comprises a board with a plurality of projections extending from one surface thereof. A sheet-like member having indicia thereon in columnar form is disposed on the board, being positioned by the projections. A plurality of secondary indicia bearing members are disposed on the board in columnar form. Each secondary member is restricted by the projections to only occupy one predetermined position on the board in juxtaposition with its correlated indicia on the sheet-like member to self-teach an educational subject to the user of the device. The sheet-like member and the plurality of secondary members define one set, whereby other sets may be used with the board for self-teaching.

Accordingly, an object of the present invention is to provide an improved educational device for self-teaching which overcomes the disadvantages of the prior art devices.

Another object of this invention is to provide a self-teaching device which is extremely simple, whereby the device can be readily produced with relatively little expense.

A further object of this invention is to provide an educational device that may be programmed for all levels, preschool through adult levels.

An added object of this invention is to provide a board for a self-teaching device which may be used with different sets covering various educational subjects.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings in which:

FIG. 3 represents a fragmentary perspective view of a modified form of the educational device of this invention;

FIG. 4 represents a top plan view of secondary members used with the modified form of the educational device shown in FIG. 3;

FIG. 5 represents a fragmentary sectional view of the modified form of the educational device, taken on the line 5—5 of FIG. 3;

FIG. 6 represents a fragmentary perspective view of a second modified form of the educational device of this invention;

FIG. 7 represents a top plan view of secondary members used with the second modified form of the educational device shown in FIG. 6.

DESCRIPTION OF THE PREFERRED EMBODIMENT

Figure 1:
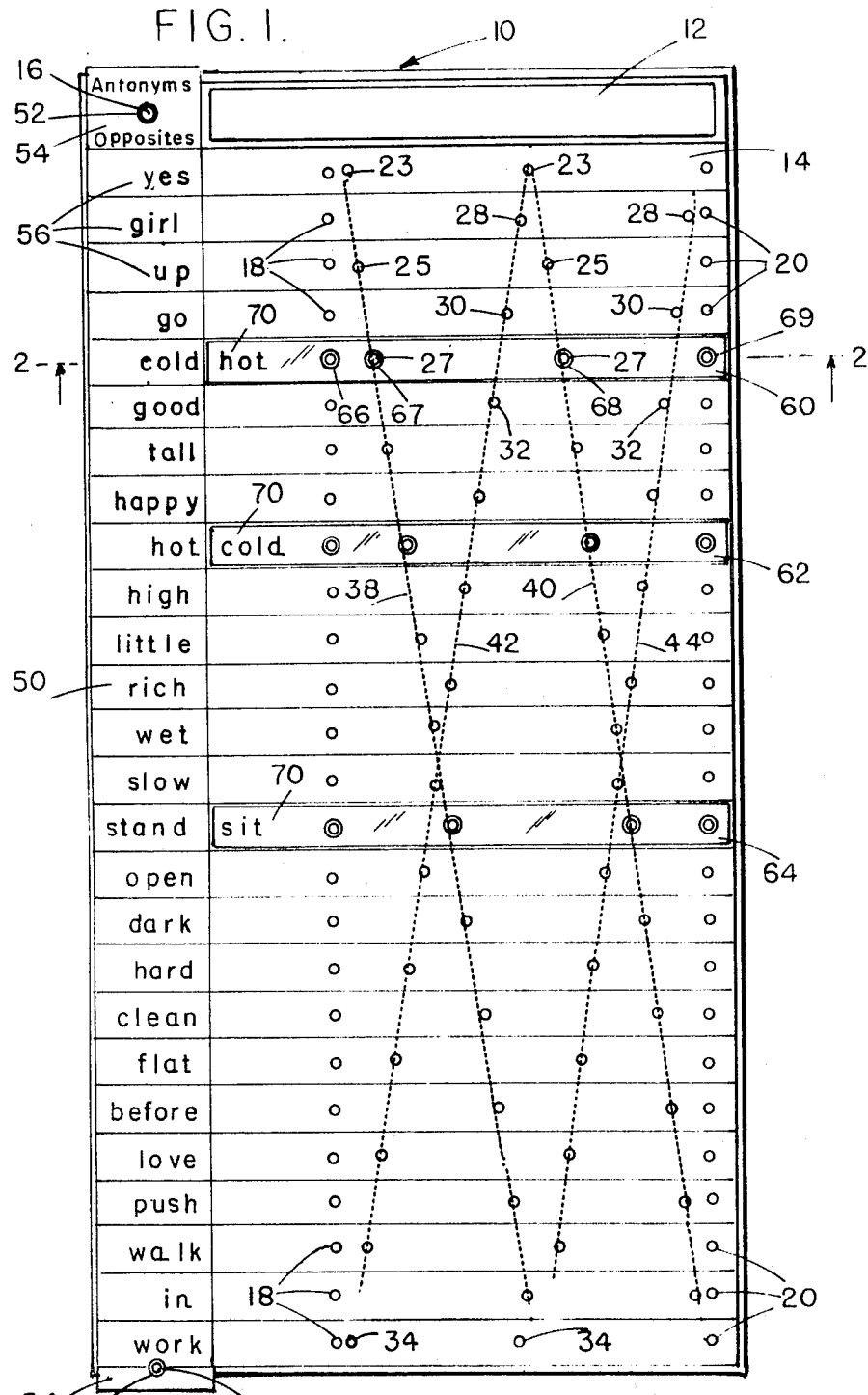
FIG. 1 represents a top plan view of an educational device pursuant to the present invention.

Referring to the drawings, FIG. 1 illustrates an educational device 10 of the present invention. The educational device 10 includes a planar board 12 and at least one set comprising a primary member and a plurality of secondary members relating to an educational subject. The board 12 includes a plurality of prearranged projections or pegs extending outwardly from an outer surface 14 of the board 12. Two pegs 16 are disposed on board 12 for positioning the primary member, preferably one peg 16 adjacent to each corner on the left-hand side of the board 12, as shown in FIG. 1.

To position the secondary members, a column of preferably twenty-six pegs 18 is disposed on the left-hand portion of the board 12 with a matching column of pegs 20 disposed on the right-hand portion of the board 12, preferably near the edge 22 thereof. Each peg 18 with its corresponding peg 20 across the board 12 defines a row, there being preferably twenty-six rows. Each row includes four aligned pegs comprising the peg 18, its corresponding peg 20 and two intermediate pegs disposed between the positioning pegs 18, 20.

The spacing between the intermediate pegs 23 in the first row from the top portion 24 of the board 12 is predetermined. The spacing between the intermediate pegs 28 in the second row from the top portion 24 is also predetermined. The spacing between the pegs 23 is different from the spacing between the pegs 28, the spacing between the peg 23 being preferably larger. The spacings between the intermediate pegs of all the odd rows, such as pegs 25 and pegs 27, are equal to the spacing between the pegs 23. The spacing between the intermediate pegs of all the even rows through the twenty-fourth row, such as pegs 30 and pegs 32, are equal to the spacing between the pegs 28. The spacing between the intermediate pegs 34 of the twenty-sixth row (the bottom row) differs from the above two spacings, being preferably smaller.

As shown in FIG. 1, the left peg 23 is closer to the column of pegs 18 than any other peg in the odd rows, with left peg 25 being spaced a little further away from the column of pegs 18, and left peg 27 being spaced still a little more further away from the column of pegs 18. As shown, the pegs of the odd rows are aligned in two parallel lines 38, 40, angularly extending from upper left to lower right, indicating the displacement from the column of pegs 18. Accordingly, the pegs of the even rows through the twenty-fourth row are spaced from the column of pegs 20, wherein the pegs of the even rows through the twenty-fourth row are aligned in two parallel lines 42, 44, angularly extending from upper right to lower left, indicating the displacement from the column of pegs 20.

From the above it is noted that no two rows have the same three spacings between their four aligned pegs, the board 12 being so programmed. It is also noted, that if additional rows are preferred, the spacing of the intermediate pegs of these additional rows could be equal to the spacing between the pegs 34, whereby the additional intermediate pegs would be similarly displaced from the columns of pegs 18, 20 as stated above. Obviously, a large number of rows having different spacings may be obtained using the above programming method.

A primary sheet-like member 50 is provided with apertures 52 on the opposite ends 54 thereof. Lines of information or indicia 56 are arranged in columnar form on an outer surface of said primary member 50. The information lines correspond in number to the number of rows on the board 12. As shown in FIG. 1, the information 56 is a list of words, the positioning order of these words, "yes," "girl," "up," etc., being predetermined. The primary member 50 is disposed on the board 12 with the aperture 52 receiving the pegs 16 to position the primary member 50 on the left-hand side of the board 12. It is noted that "Antonyms Opposites" appears on the heading of primary 50. The ends 54 of the primary member 50 preferably extend over the edge of the board 12 so that the primary member 50 may easily be removed from the board 12.

A plurality of thin secondary members is associated with the primary member 50, secondary members 60, 62, 64 being three examples of preferably twenty-six secondary members of the set. Each secondary member is provided with four aligned apertures therein, for example, secondary member 60 is provided with aperatures 66, 67, 68, 69. A line of information of indicia 70 is disposed on each secondary member, preferably on the left side thereof. For example, "hot" is disposed on secondary member 60, "cold" is disposed on secondary member 62 and "sit" is disposed on secondary member 64.

The set shown in FIG. 1, as indicated by the heading on the primary member 50, is to self-teach antonyms, whereby these antonyms are chosen for a particular age group. With the primary member 50 in position on the board 12, the student picks up one of the secondary members, for example the secondary member 60. The student reads the word "hot" on the secondary member 60 and looks at the list of words on the primary member 50 to find an associated word that has an opposite meaning. When the student finds the associated word on the primary member 59, the student disposes the secondary member 60 on the board 12 in juxtaposition with the associated word to correlate the words.

Figure 2:
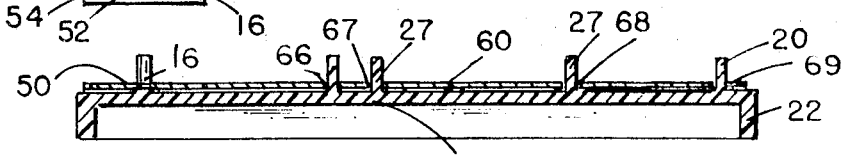
FIG. 2 represents a sectional view of the educational device of this invention, taken on the line 2—2 of FIG. 1.

If the correlation is proper, the apertures in the secondary member will easily receive the row of pegs adjacent to the found word on the primary member 50. For example, if the student chooses "cold" on the primary member 50, then the apertures 66, 67, 68, 69 will easily receive the pegs 18, 27, 27, 20 respectively, as shown in FIG. 2, because the match is proper. However, if the student had chosen "wet," the apertures 66, 67, 68, 69 would not receive the pegs adjacent thereto, thereby correcting the student. As stated above, the board 12 is programmed so that the apertures of the secondary member 60 can only receive one row of pegs to properly position the secondary member 60 on the board 12.

The student continues to correlate the words 70 on the secondary members with their associated words 56 listed on the primary member 50, where "cold" on the secondary member 62 matches "hot" on the primary member 50, and "sit" on the secondary member 64 matches "stand" on the primary member 50. Some of the correlations the student may obtain by trial and error, whereby the student continuously positions the secondary member until its apertures properly receive a row of pegs. Finally, the secondary members will be mounted on the board 12 in columnar form, each secondary member being disposed in juxtaposition with correlated information on the primary member 50 so that the student may teach himself. When the student feels he has learned the subject matter, he may remove the secondary members and start over again. Each secondary member may extend over the edge 22 of the board 12 so that the secondary member may easily be removed therefrom.

FIG. 3 illustrates the board 12 being used with another set comprising a primary sheet-like member 72 provided with apertures 74 on opposite ends 76 thereof. A list of information 78 is disposed on the primary member 72, comprising words "rain," "tail," "days," etc. in a predetermined order. The primary member 72 is disposed on the board 12 with the apertures 74 receiving the pegs 16 to position the primary member 72. It is noted that "Homonyms" appears on the heading of the primary member 72.

The secondary members 80 of this second set, as shown in FIG. 4, are similar to the secondary members of the first set, but having different associated information 82. Each second member 80 has four aligned apertures 84, so that the secondary member 80 can only be positioned to properly receive one row of pegs on the board 12, similar to that stated above. This second set is to self-teach homonyms, whereby the above procedure is followed. Referring to FIG. 3, "daze" matches "days," "knot" matches "not," and "suite" matches "sweet." The associated secondary members 80 is disposed in juxtaposition with its correlated information on the primary member 72 as shown in FIG. 5, to self-teach homonyms. It is noted that each of the secondary members 80, shown in FIG. 4, can only be mounted in one position on the board 12, where referring to FIG. 1, it is observed that "rein" must be positioned in the first row next to "rain," "hale" must be positioned in the fourth row next to "hail," and "shone" must be positioned in the fifth row next to "shown."

FIG. 6 illustrates the board 12 being used with another set comprising a primary sheet-like member 90 provided with apertures 92 on opposite ends 94 thereof, provided also with a list of information 96, comprising numerals "1" to "26" in descending order. The secondary members 98 of this third set, as shown in FIG. 7, are similar to the secondary members of the first two sets, but having different associated information 100. Each secondary member 98 has four aligned apertures 102, so that the secondary member 98 can only be positioned to properly receive one row of pegs on the board 12, similar to that stated above. In this third set the word for the number is positioned next to the numeral, for example "four" is positioned next to "4," "nine" is positioned next to "9," etc.

As indicated above, the board 12 may be used with many sets of educational information. These sets may be designed for young children, pre-teens and teenagers, whereby these sets may also be used by adults who require reinforcement in basic subject areas. Sets may be programmed in the areas of language arts, mathematics, social studies and science, whereby these sets would be placed in categories ranging from pre-schoolers to adults.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. An educational device comprising a board and at least one set including a primary information bearing member and a plurality of secondary information bearing members, said board being provided with first means to position said primary member thereon, said board being provided with second means to position said secondary members thereon, said second means restricting each of said secondary members to a predetermined position on said board with respect to said primary member, said positions for said secondary members differing from one another so that the information on each of said secondary members is associated with correlated information on said primary member, whereby the device permits self-teaching in that only one correlated association may be obtained for each of said secondary members, said second means including projections disposed on said board, said projections defining rows, each row including at least two spaced projections to provide a first projection associated with a second projection for each row, said first projections being equally spaced from one edge of said board to define a columnar arrangement for positioning said secondary members in juxtaposition with said primary member, each second projection being the next spaced projection from its associated first projection, each second projection being disposed between its associated first projection and said one edge of said board with both spacings between said second projection and its associated first projection and between said second projection and said one edge differing for each row, each secondary member being provided with at least two apertures to only receive said first and second projections of one predetermined row so that each secondary member is restricted to a different row.

2. An educational device according to claim 1, wherein each row includes four spaced projections, two of said four projections from each row including said first projection and being arranged in columnar form to define two equally spaced columns to position said secondary members in juxtaposition with said primary member.

3. An educational device according to claim 2, wherein the other two of said four projections from each row include said second projection and are arranged in parallel lines angularly extending between said two columns.

4. An educational device according to claim 3 wherein a first group of rows has one spacing between said other two projections, and a second group of rows has another spacing between said other two projections to increase the number of possible rows on said board.

5. An educational device according to claim 3, wherein said primary member is an elongated sheet-like member, said first means positioning said sheet-like member on said board with longitudinal edges of said sheet-like member being parallel to said one edge of said board, said secondary members being thin members, said second means positioning said thin members in a parallel arrangement between said sheet-like member and said one edge of said board with longitudinal edges of said thin members being perpendicular to said longitudinal edges of said sheet-like member.

6. An educational device according to claim 5 wherein said first means comprises at least two projections disposed on said board, said primary member being provided with apertures to receive said last-mentioned projections.

7. An educational device for associating a primary indicia bearing member with correlated secondary associated indicia bearing members having a predetermined relationship to indicia items on the primary member, said device comprising a planar board provided with means for mounting the primary indicating member having the indicia items thereon arranged in columnar form, means carried by said planar board for locating the secondary indicia bearing members in correlated association with the indicia items on the primary indicating member, said locating means being arranged so that only the secondary indicia bearing member having the correlated indicia can be disposed in juxtaposition with the correlated indicia item carried by the primary indicia bearing member, said locating means including projections disposed on said planar board, said projections defining rows, each row including at least two spaced projections to provide a first projection associated with a second projection for each row, said first projections being equally spaced from one edge of said board to define a columnar arrangement for positioning said secondary indicia bearing members in juxtaposition with said primary member, each second projection being the next spaced projection from its associated first projection, each second projection being disposed between its associated first projection and said one edge of said planar board with both spacings between said second projection and its associated first projection and between said second projection and said one edge differing for each row, each secondary indicia bearing member being provided with at least two apertures to only receive said first and second projections of one predetermined row so that each secondary indicia bearing member is restricted to a different row.

8. An educational device according to claim 7, wherein said primary member is an elongated sheet-like member, said mounting means positioning said sheet-like member on said planar board with longitudinal edges of said sheet-like member being parallel to said one edge of said planar board, said secondary members being thin members, said locating means positioning said thin members in a parallel arrangement between said sheet-like member and said one edge of said board with longitudinal edges of said thin members being perpendicular to said longitudinal edges of said sheet-like member.

9. An educational device according to claim 7 wherein said mounting means comprises at least two projections disposed on said planar board to be receivable in apertures provided in the primary indicating member.

References Cited
UNITED STATES PATENTS

| | | | |
|---|---|---|---|
| 2,887,789 | 5/1959 | Bobo et al. | 35—9 A |
| 3,469,325 | 9/1969 | Greenberg et al. | 35—9 R |
| 1,701,557 | 2/1929 | Clinch et al. | 35—35 H |

WILLIAM H. GRIEB, Primary Examiner